United States Patent [19]

Mitsutsuka et al.

[11] Patent Number: 5,840,636
[45] Date of Patent: Nov. 24, 1998

[54] CONVEYOR BELT HAVING A WOVEN FABRIC BACKING

[75] Inventors: Yoshinori Mitsutsuka, Hamamatsu; Hans-Georg Tope, Langenhagen; Burkhard Koenig, Neustadt, all of Germany

[73] Assignee: Forbo International S.A., Eglisau/Zurich, Switzerland

[21] Appl. No.: 756,016

[22] Filed: Nov. 25, 1996

[30] Foreign Application Priority Data

Nov. 25, 1995 [DE] Germany ............... 195 43 975.9

[51] Int. Cl.[6] ........................... D03D 3/00; F16G 1/00
[52] U.S. Cl. .................. 442/203; 442/205; 442/208; 442/201; 474/237; 474/260; 474/263; 474/266; 474/267; 474/268
[58] Field of Search ........................ 474/237, 260, 474/261, 263, 266, 267, 268; 442/203, 265, 208, 209

[56] References Cited

FOREIGN PATENT DOCUMENTS 69 02 532  6/1969  Germany .
89 00 626.7  4/1989  Germany .
4339709  5/1995  Germany .
7-5176  8/1991  Japan .

OTHER PUBLICATIONS

Vogelsberg, "Neue Verseilverfahren fur Nachrichtenkabel", *Siemens–Zeitschrift* 50 (1976), No. 10, pp. 694–699.

Primary Examiner—Patrick Ryan
Assistant Examiner—J. M. Gray
Attorney, Agent, or Firm—Evenson, McKeown, Edwards & Lenahan P.L.L.C.

[57] ABSTRACT

A conveyor belt is described having a woven fabric backing which includes staple fiber yarn and includes a twill weave with an inclination angle of 10° to 70° relative to the moving direction of the conveyor belt, and in which adjacent yarns have the same direction of lay. In the woven fabric backing the staple fiber yarn is provided as warp yarn, each of which has the same direction of lay in its longitudinal direction, and adjacent yarns of which are alternately S and Z twisted. Additionally, elements which support the tensile forces are arranged in the conveyor belt, the elements being arranged in a woven fabric or being sheathed as threads by staple fibers. Since the staple fiber yarn of the warp of the woven fabric backing extends diagonally over the entire width of the conveyor belt, an endless support results even when the belt runs over an edge, and an absolutely uniform vibration-free conveyor belt movement having a low noise level is achieved even when the belt passes over an edge.

6 Claims, 2 Drawing Sheets

CONVEYOR BELT HAVING A WOVEN FABRIC BACKING

BACKGROUND OF THE INVENTION

The invention relates to a conveyor belt having a woven fabric backing which includes staple fiber yarn in a twill weave with an inclination angle of 10° to 70° relative to the moving direction of the conveyor belt (1) and in which adjacent yarns have the same direction of lay.

When using conveyor belts, the running noise becomes disturbing under certain operating conditions. In order to remedy this, it has already become known from Japanese Examined Patent Publication No.:5176/95 (JP-B2-7-5176), to employ staple fiber yarns in the weft of the woven fabric backing which comprises a twill weave with an inclination angle of 10° to 70° relative to the moving direction of the conveyor belt. By this means it has been possible to reduce the sliding noises of conveyor belts, however, in these woven fabric backings the weft, which forms a raised part, can produce strong noises. This involves the edge of the belt experiencing shock-like effects at each weft thread, which produce a vibration of the conveyor belt, which in turn is associated with the production of noise.

In published German Utility Model No. DE-GM 69 02,532 describes the use of a common gauze fabric with pointed twill weave as fabric insert for conveyor belts. In this case a higher fabric density is obtained, and the strength of the fabric core is enhanced. Moreover, a greater flexibility is obtained as compared with conventional fabric inserts, and an enhanced structural strength is obtained by the use of a twisted cellulose staple fiber. Furthermore, the twisted cellulose staple fiber improves the adhesion of the fabric insert.

German Utility Model No. DE 89 00 626.7 U1 discloses constructing the backing side of a conveyor belt in the form of the pile of a plush fabric in order to improve the running smoothness of the belt. Moreover, a fabric layer which is formed as uncut-up double plush fabric is arranged in the conveyor belt. The double plush fabric comprises an upper fabric and a lower fabric with loop piles bound to the weft threads. In this way, the tensile forces occurring in the conveyor belt are supported by the upper fabric and the lower fabric.

Published German Patent Application No. DE 4,339,709 A1 deals with the enhancement of the strength of multilayered nonwovens which contain staple fibers and which are employed in conveyor belts or alternatively as a filter medium.

Vogelsberg, "Neue Verseilverfahren fur Nachrichtenkabel", *Siemens-Zeitschrift* 50 (1976), No. 10, has described the lays of a twisting having an S-, Z- and SZ-twisting.

SUMMARY OF THE INVENTION

It is the object of the invention to provide a conveyor belt, which comprises a woven fabric backing including staple fiber yarn and which runs without mentionable running noise, such that despite strong tensile forces exerted on the belt even when it is running over an edge, it produces no mentionable running noises, and which has good directional stability.

These and other objects of the invention are achieved by providing a conveyor belt for movement in a moving direction, the conveyor belt having a woven fabric backing, the woven fabric of the backing comprising staple fiber yarns and being woven in a twill weave with an inclination angle of from 10° to 70° relative to the moving direction of the conveyor belt, wherein the staple fiber yarns are warp yarns of the woven fabric, adjacent warp yarns having the same direction of lay in a longitudinal direction and being alternately S and Z twisted, and the conveyor belt further comprising elements for supporting tensile forces, the tensile force supporting elements being arranged in a woven fabric or being sheathed as threads by staple fibers.

In accordance with further preferred embodiments of the invention, the twill weave has an inclination angle of 30°; the woven fabric backing comprises a monofilament weft, and the staple fiber yarn used as warp thread has a thread strength of at least Nm 34/2; and the woven fabric backing comprises a pointed twill weave, preferably a twill weave in herringbone arrangement, especially a K 2/1 twill.

The units Nm refer to a traditional size or weight designation for yarns or threads, particularly staple fiber yarns. This measure also is sometimes referred to as a length number. The numerical value to the left of the slash refers to the length of the yarn in meters, and the numerical value to the right of the slash refers to the weight of the yarn in grams. If only a single number is given, it represents the length in meters of a yarn which weighs one gram. Thus Nm 34/2 designates a yarn which at 34 meters in length weighs 2 grams, and Nm 120 refers to a yarn which at 120 meters in length weighs 1 gram.

Due to the facts that according to the invention, the staple fiber yarn in the woven fabric backing is used as warp yarn and yarns lying adjacent are alternately S and Z turned, and that the woven fabric backing comprises a twill weave with an inclination angle of 10° to 70°, preferably 30°, relative to the moving direction of the conveyor belt, and that additional elements for supporting the tensile forces are arranged in the conveyor belt, it becomes possible to employ staple fiber yarns in the warp, and thus it is achieved that when the conveyor belt runs over an edge the staple fiber yarn which diagonally extends over the full width of the belt makes the belt slide ridgelessly over the edges. In addition to the advantage of the easily gliding fitting of the staple fibers, an absolutely uniform conveyor belt movement is achieved under all conditions with little or no vibration and with low noise, due to the alternating direction of lay of the yarns, among other reasons.

Elements which support the tensile forces also are arranged in the conveyor belt in addition to the woven fabric backing. These elements enhance the tensile strength, since the staple fiber yarns arranged in the warp have only a low tensile strength. In one case, the element supporting the tensile forces is formed by a woven fabric. However, in another case, it is also possible that the staple fiber yarn merely forms the shell of one or more threads which support the tensile forces. In this case the staple fiber yarn lies at the surface as well and causes the described effect that muffles noises.

According to a preferred embodiment of the invention, the woven fabric backing comprises a pointed twill weave. In this case, besides an also at edges uniform fitting of the staple fiber yarn which lies at the surface of the woven fabric backing, with the uniform fitting resulting from the inclination angle of the pointed twill, additionally an optimal directional stability of the conveyor belt results due to the angled arrangement with respect to each other.

The same advantage results if the woven fabric backing comprises a twill weave in a herringbone arrangement. In this case also, the twill arranged at an angle with respect to each other promotes the directional stability of the conveyor belt.

In particular, optimal conditions result when the woven fabric backing is formed by a pointed twill of K 2/1. In this case a particularly advantageous inclination angle of 30° relative to the moving direction of the conveyor belt is obtained.

It is further considered within the scope of the invention that the woven fabric backing includes a monofilament weft. The monofilament weft makes it possible to enhance the width-wise rigidity of the conveyor belt, so that a good flatness of the conveyor belt is achieved.

BRIEF DESCRIPTION OF THE DRAWINGS

The invention will be described in further detail hereinafter with reference to illustrative preferred embodiments depicted in the accompanying drawings in which.

DETAILED DESCRIPTION OF THE PREFERRED EMBODIMENTS

Figure 6:
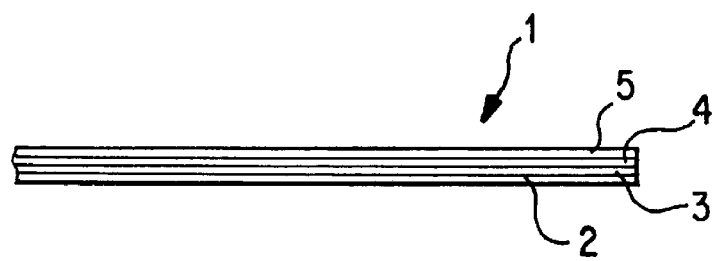
FIG. 6 shows a cross section through a conveyor belt according to the invention.

In the drawings a conveyor belt is denoted with 1 which, as can be seen from FIG. 6, comprises a woven fabric backing 2 which is bonded with an element 4, that supports the tensile forces, via an intermediate layer 3 which forms the bond. In the illustrated embodiment, the element 4 is formed as a woven fabric. On top of the fabric supporting the tensile forces, a functional layer 5 is arranged on which the goods (not shown in the drawings) are conveyed.

Figure 1:
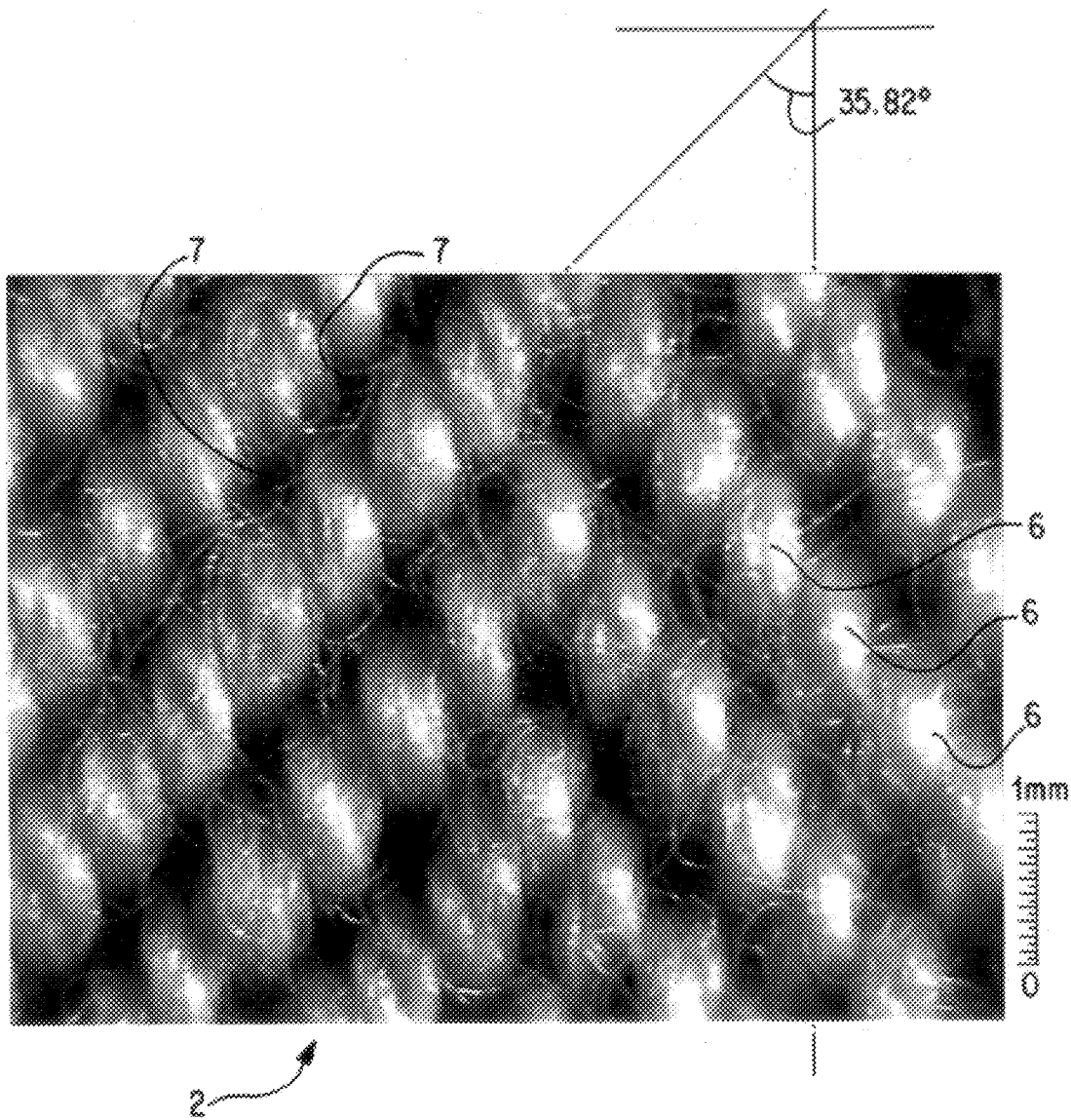
FIG. 1 shows a woven fabric backing in pointed twill weave in enlarged photographic representation.

From FIG. 1 it can be seen that staple fiber yarn 6 is arranged as warp yarn in the woven fabric backing 2. In addition, the woven fabric backing 2 comprises a monofilament weft 7. Because the woven fabric backing 2 comprises a pointed twill weave, at the surface the staple fiber yarn 6 is arranged angled with respect to the moving direction of the conveyor belt 1. Moreover, the staple fiber yarn 6 has a significantly greater diameter than the monofilament weft 7. Thus, running of the woven fabric backing 2 over an edge without jerking is facilitated. As has turned out, a significant reduction of the running noise of conveyor belts 1 results from the gliding without jerking. It has been found that warp threads with thread strengths at or above Nm 34/2 provide sufficient bulkiness in order to achieve the desired effect of a ridgeless and soft fitting. The monofilament weft 7 is covered by the is pointed twill weave.

Furthermore, the formation of the woven fabric backing 2 in pointed twill weave ensures the directional stability of conveyor belts 1 designed in that way.

In a preferred embodiment the warp thread consists of ring-spun staple fiber yarn 6 with 60 mm staple length of polyester filaments 3.3 dtex in size. The thread is turned with 300 turns per meter, with S and Z turned threads alternating.

The weft 7 consists of 0.3 mm polyester monofilament. The weave is pointed twill of twill K 2/1, 2 cm wide alternating.

Figure 2:
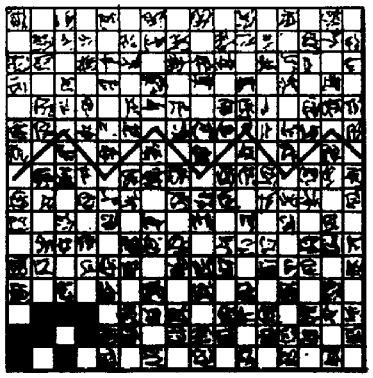
FIG. 2 shows the base weave pattern of a woven fabric backing, the pattern consisting of a pointed twill of twill 2/1.
Figure 3:
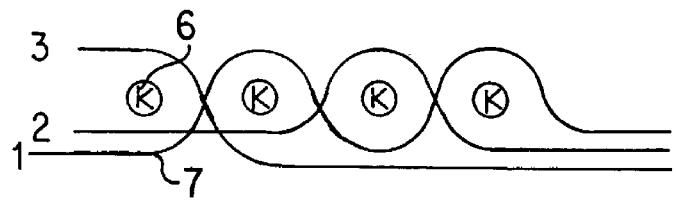
FIG. 3 shows a weave cross section through the twill weave of twill 2/1.

From FIG. 2 the basic design of a pointed twill of K 2/1 can be seen. From FIG. 3 it is evident how the monofilament weft 7 is passed around the staple fiber yarn forming the warp.

Figure 4:
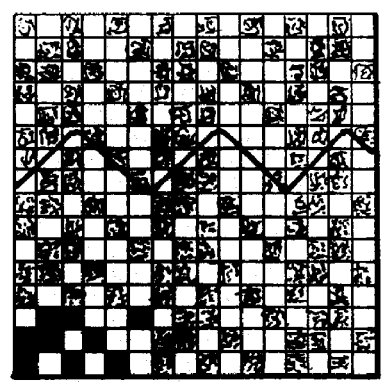
FIG. 4 shows a woven fabric backing in herringbone weave of twill 2/1.
Figure 5:
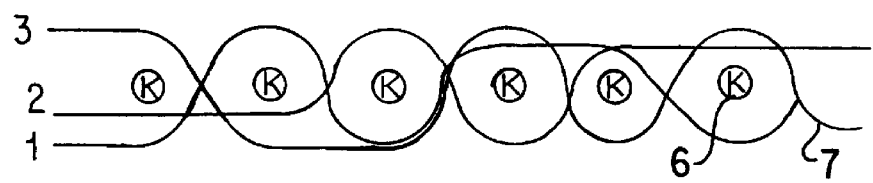
FIG. 5 shows a weave cross section through the herringbone weave of twill 2/1.

FIG. 4 shows the basic design of a herringbone of K 2/1. Additionally, from the warp section of FIG. 5 the course of the weft 7 and staple fiber yarn 6 can be seen.

In principle, it is possible, for instance, also to use the three classical twill weaves, twill 2/1 , twill 3/1 and twill 2/2 . In the classical twill weave, however, supported areas result which extend straight, in an angle to the moving direction, and which are formed by the staple fiber yarn 6, whereby under certain conditions these areas can lead to a skewing of the conveyor belt. As already explained, a skewing of the belt is avoided by the use of a pointed twill. In principle, the more densely the staple fiber yarn 6 is arranged, the steeper the angle of inclination of the twill will be. The more open the arrangement of the yarn 6, the flatter the twill inclination will be. Due to the herringbone weave, a continuous passage of the staple fiber yarn 6 occurs when the woven fabric backing 2 travels over an edge. This continuous passage has the effect that transverse jerks at such edges are avoided, and thus a low noise level of the conveyor level 1 is achieved, which has not been attainable in the prior art.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A conveyor belt for movement in a moving direction, said conveyor belt having a woven fabric backing, the woven fabric of said backing comprising staple fiber yarns and being woven in a twill weave with an inclination angle of from 10° to 70° relative to the moving direction of the conveyor belt, wherein said staple fiber yarns are warp yarns of said woven fabric, adjacent warp yarns having the same direction of lay in a longitudinal direction and being alternately S and Z twisted, and said conveyor belt further comprising elements for supporting tensile forces, said tensile force supporting elements being arranged in a woven fabric or being sheathed as threads by staple fibers.

2. A conveyor belt according to claim 1, wherein the twill weave has an inclination angle of about 30°.

3. A conveyor belt according to claim 1, wherein the woven fabric of said backing comprises a monofil weft, and wherein the staple fiber warp yarns have a thread strength of at least Nm 34/2.

4. A conveyor belt according to claim 1, wherein the woven fabric of said backing is woven in a pointed twill weave.

5. A conveyor belt according to claim 1, wherein the woven fabric of said backing is woven in a herringbone twill weave.

6. A conveyor belt according to claim 1, wherein the woven fabric of said backing is woven in a K 2/1 twill weave.

* * * * *